United States Patent [19]
Zaharia et al.

[11] Patent Number: 5,540,287
[45] Date of Patent: Jul. 30, 1996

[54] GROUND WORKING DEVICE FOR POWERED HAND-HELD ROTARY DEVICES

[76] Inventors: Paul M. Zaharia, 2015 8th St. NW., #18, Minot, N. Dak. 58701; Lisa G. Kiemele, Rte. 1, Box 107, Cavalier, N. Dak. 58220

[21] Appl. No.: 323,831

[22] Filed: Oct. 17, 1994

[51] Int. Cl.⁶ ................................................. A01B 33/06
[52] U.S. Cl. .............................. 172/111; 172/41; 172/523
[58] Field of Search ................................ 172/41, 25, 110, 172/111, 522, 523, 525

[56] References Cited

U.S. PATENT DOCUMENTS

| | | | |
|---|---|---|---|
| 3,006,423 | 10/1961 | Buddingh et al. | 172/523 |
| 4,287,955 | 9/1981 | Anderson | 172/111 |
| 4,544,038 | 10/1985 | Schonert | 172/111 |
| 4,911,247 | 3/1990 | Kühlmann et al. | 172/41 |
| 4,936,391 | 6/1990 | Cameron | 172/111 |
| 5,054,559 | 8/1991 | Paul | 172/111 |
| 5,287,932 | 2/1994 | Fleck | 172/111 |

FOREIGN PATENT DOCUMENTS

| | | | |
|---|---|---|---|
| 1486568 | 6/1967 | France | 172/111 |
| 3631436 | 4/1987 | Germany | 172/41 |

*Primary Examiner*—Spencer K. Warnick, IV
*Attorney, Agent, or Firm*—David A. Lingbeck

[57] ABSTRACT

A ground working device for powered hand-held rotary devices includes four resilient ground working members mounted upon and extending downwardly from a mount and includes a weighted hub which along with the mount is detachably attached to the bottom of a rotatable shaft of a rotary device for rotation therewith and includes a flexible shroud fastenable to a housing of the rotatable shaft and shrouding the ground working members to prevent debris from being sent airborne and possibly injuring the user or others nearby. The ground working device conveniently and easily tills, weeds, and cultivates the ground especially lawns and gardens.

7 Claims, 6 Drawing Sheets

GROUND WORKING DEVICE FOR POWERED HAND-HELD ROTARY DEVICES

BACKGROUND OF THE INVENTION

This invention relates to a ground working attachment for powered hand-held rotary devices to work the ground such as weeding or cultivating the ground especially for lawns and gardens.

Powered hand-held rotary devices having a blade assembly or a flexible cord assembly attached thereto for trimming and weeding around the lawn or garden are well known in the art. Larger implements which are adapted to be pulled by a tractor for cultivating, furrowing, or working the ground in some manner are also known in the art. However, none of the prior art discloses a ground working attachment of the present invention.

One known prior art is a PRONG-EQUIPPED GARDEN TOOL, U.S. Pat. No. 5,207,466, which comprises an elongate shaft having a handle at one end and a plurality of circumferentially spaced prongs at the other end.

Another known prior art is a SOIL CULTIVATING TINES, U.S. Pat. No. 4,018,289, which comprises a tine having an upper fastening portion which is tightly received in a holder with the lower portion being ground engageable.

Another known prior art is a GROUND WORKING IMPLEMENT ASSEMBLY, U.S. Pat. No. 4,606,089, which comprises a handle and a plurality of implement heads.

Another known prior art is a ROTARY WEEDING MACHINE, U.S. Pat. No. 4,323,125, which comprises a transverse tool bar adapted to be attached to a three-point hitch of a tractor, two wheels mounted at each end of the tool bar, and a plurality of vertical shafts mounted for rotation on the tool bar and each supporting a soil-working device adapted to cut the weeds between rows of plants.

Another known prior art is a ROTARY FURROWING TOOL, U.S. Pat. No. 3,710,871, which comprises a cylindrical rim, a cutting blade means for cutting a vertically arranged longitudinal slit in the ground, and a dig-out tooth means for pulverizing and removing the soil next to the slit.

Another known prior art is a ROTARY WEEDER OR CULTIVATOR APPARATUS, U.S. Pat. No. 3,489,227, which comprises a triangular frame, guards mounted on an endless drive mechanism upon the frame, and cultivator elements mounted upon the guards.

Another known prior art is a ROTARY WEEDING AND EDGING ATTACHMENT FOR ROTARY POWER SOURCE, U.S. Pat. No. 3,554,293, which comprises a skirt, cleats to anchor the skirt to the ground, a hub fixed atop the skirt, a shaft rotatably extending through the hub, and a blade attached to the bottom of the shaft.

Another known prior art is a PLANT REMOVING, MOVING AND TRIMMING APPARATUS, U.S. Pat. No. 5,228,521, which comprises a helical coil assembly mounted on a shaft at right angles to the coil.

None of the prior art disclosed above describes or suggests the ground working device for portable powered rotary devices which penetrates the surface of the ground and can be easily conveniently used in restricted places.

SUMMARY OF THE INVENTION

This invention relates to a ground working device for powered hand-held rotary devices, which comprises a ground working means mount attached to the bottom of a rotatable shaft of a powered rotary device for rotation therewith, a plurality of resilient, biasedly-disposed ground working means mounted upon the ground working means mount for working the ground, and a weighted hub received in the ground working means mount and also fixedly attached to the bottom of the rotatable shaft to stabilize and limit the ground penetration of the ground working means.

One object of the present invention is to provide a ground working device for powered hand-held rotary devices which can be used to conveniently weed, trim, cultivate, or even till the ground in hard-to-reach places, in particular.

Another object of the present invention is to provide a ground working device for powered hand-held rotary devices which allows the user to effectively till or cultivate the ground in and about gardens as such.

Also, another object of the present invention is to provide a ground working device for powered hand-held rotary devices which virtually eliminates the user having to use a manually-operated device to hoe or till the garden.

Further, another object of the present invention is to provide a ground working device for powered hand-held rotary devices which is more effective and faster than manually-operated devices.

Further objects and advantages of the present invention will become apparent as the description proceeds and when taken in conjunction with the accompanying drawings wherein:

DETAILED DESCRIPTION OF THE INVENTION

Figure 1:
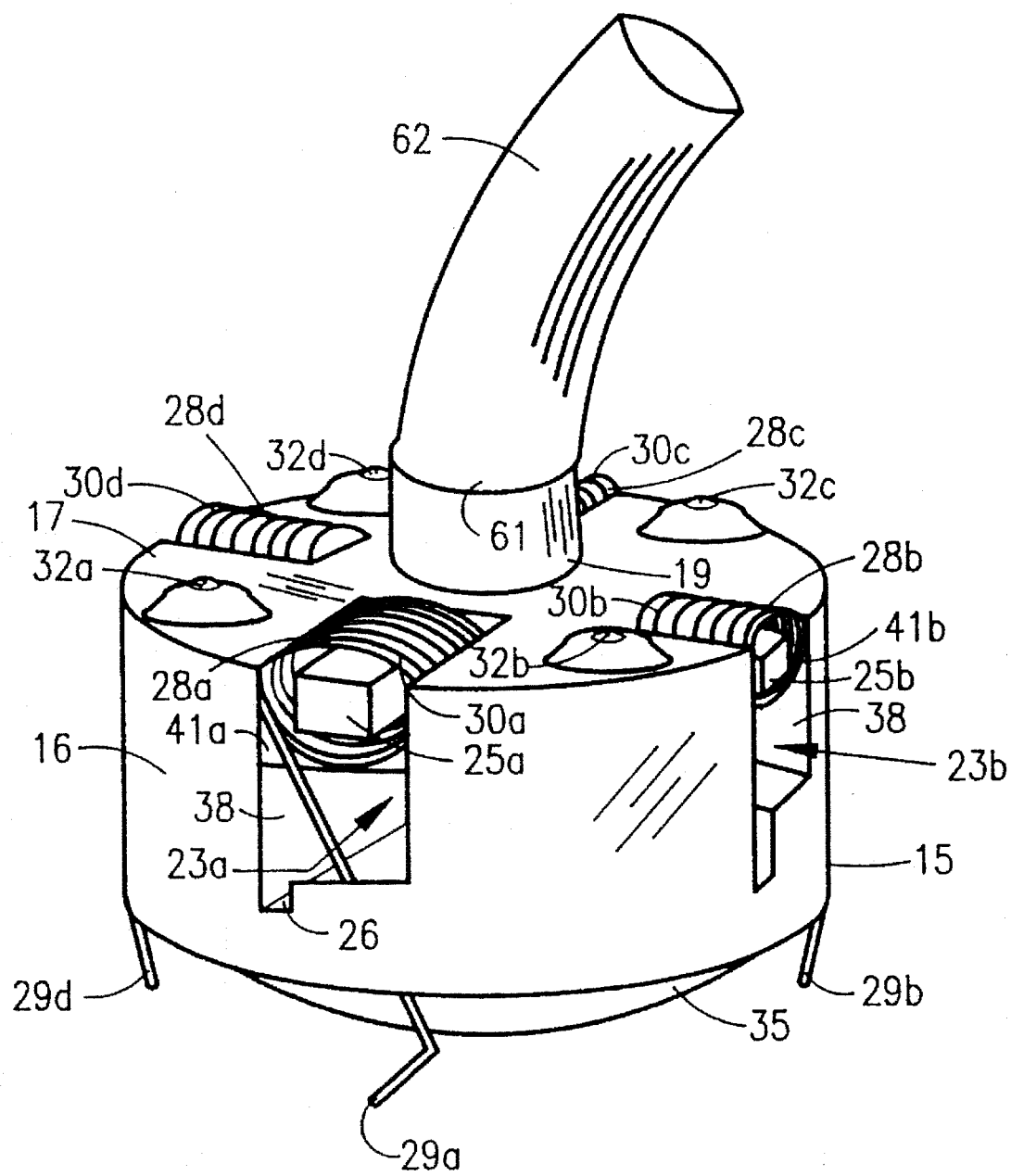
FIG. 1 is a perspective view of the ground working device attached to a portable, hand-held rotary device.

Referring to the drawings in FIGS. 1–6, in particular, the ground working device for powered hand-held rotary devices comprises a plurality of ground working means 28a–d wherein each of the ground working means 28a–d comprises a shank portion 29a–d which extends from a coiled portion 30a–d and further comprises a linking portion 31a–d which also extends from the coiled portion 30a–d, the shank portion 29a–d being adapted to work the ground and the linking portion 31a–d being adapted to fasten the ground working means 28a–d to a ground working means mount 15 which is essentially an inverted cup-like shell having an annular side wall 16, a top wall 17, and an open bottom 18, and also having a boss 19 axially disposed upon the top wall 17, the boss 19 further having a shaft receiving recess 20 also axially disposed through the top of the boss 19, the shaft receiving recess 20 having a generally hexagonal-shaped lower portion 21 for receiving and engaging a hexagonal-shaped nut conventionally mounted about the lower portion 61 of the rotatable shaft 60 of the powered hand-held rotary device 55, which is also received in a bore 22 which extends axially through the recess, the bore 22 being dimensioned to receive the lower portion 61 of the shaft 60.

Figure 2:
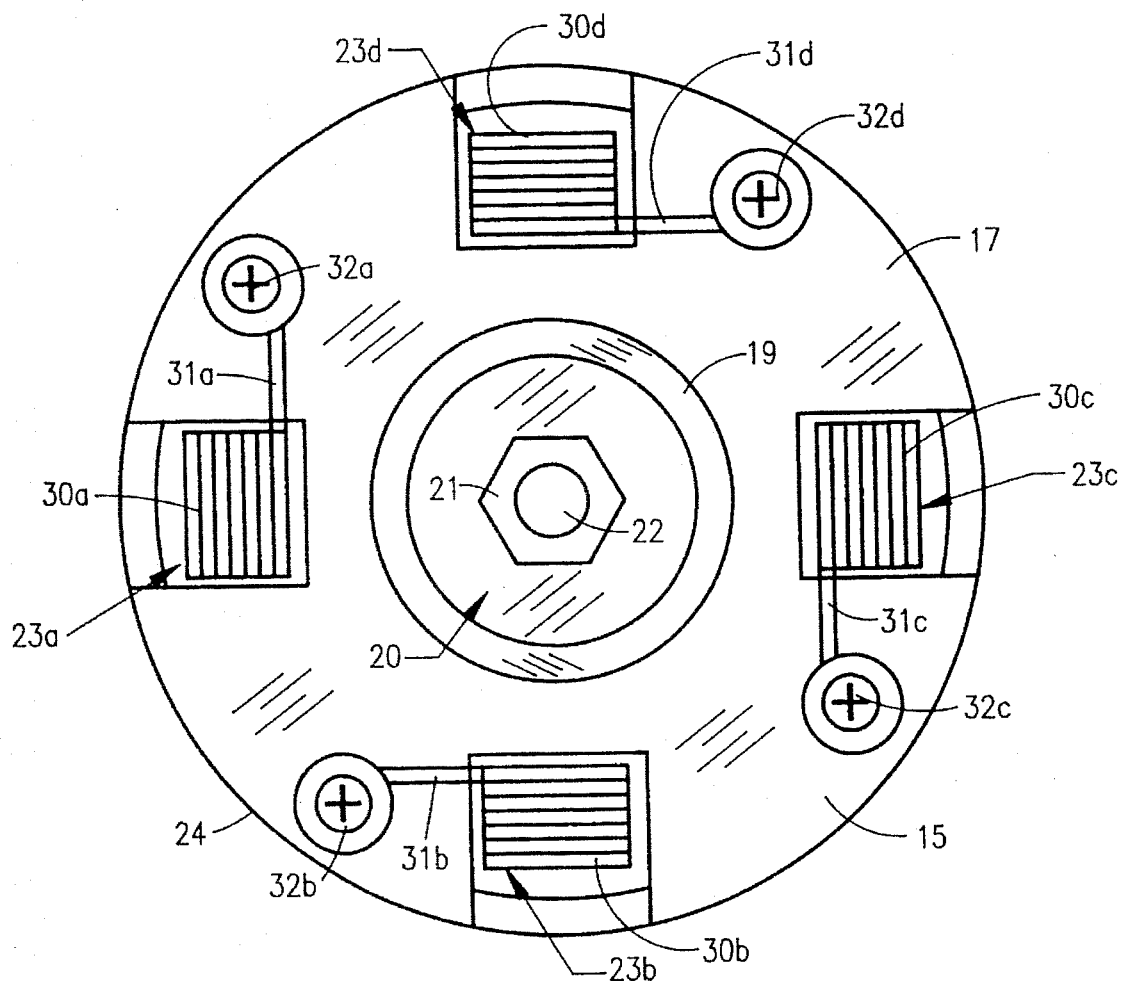
FIG. 2 is a top plan view of the ground working device.

As illustrated in FIGS. 1 & 2, the ground working device 10 also comprises a plurality of slots 23a–d which extend through and are circumferentially spaced about the ground working means mount 15. The slots 23a–d extend through the outer edge 24 of the top wall 17 and through the top edge 26 of the annular side wall 16. Four finger-like supports 25a–d extend in the slots 23a–d, one for each slot 23a–d. The finger-like supports 25a–dare integrally attached to the top wall 17 and extend outward in respect to the center of the top wall 17. The finger-like supports 25a–d are generally disposed in the same plane as the top wall 17 of the mount 15. The ground working means 28a–d are mounted upon the finger-like supports 25a–d with the finger-like supports 25a–d extending through the coiled portion 30a–d and with the shank portion 29a–d extending downwardly generally parallel to the side wall 16 with a lower portion of the shank portion 29a–d extending beyond the bottom of the side wall 16. The ends of the linking portions 31a–d of the ground working means 28a–d which are preferably spring teeth, are fixedly fastened with bolts 32a–d to the top wall 17 of the ground working means mount 15 to hold the coiled portions 30a–d of the ground working means 28a–d upon the finger-like supports 25a–d. Each of the shank portions 29a–d has an arcuate bottom portion with the bottom of the shank portion 29a–d disposed slightly in the direction of rotation of the ground working means mount 15. The shank portions 29a–d are capable of recoiling upon contact with an immoveable object in the ground and then rebounding after passing the immoveable object so that the shank portions 29a–d do not catch in the ground and cause injury to the user.

Figure 3:
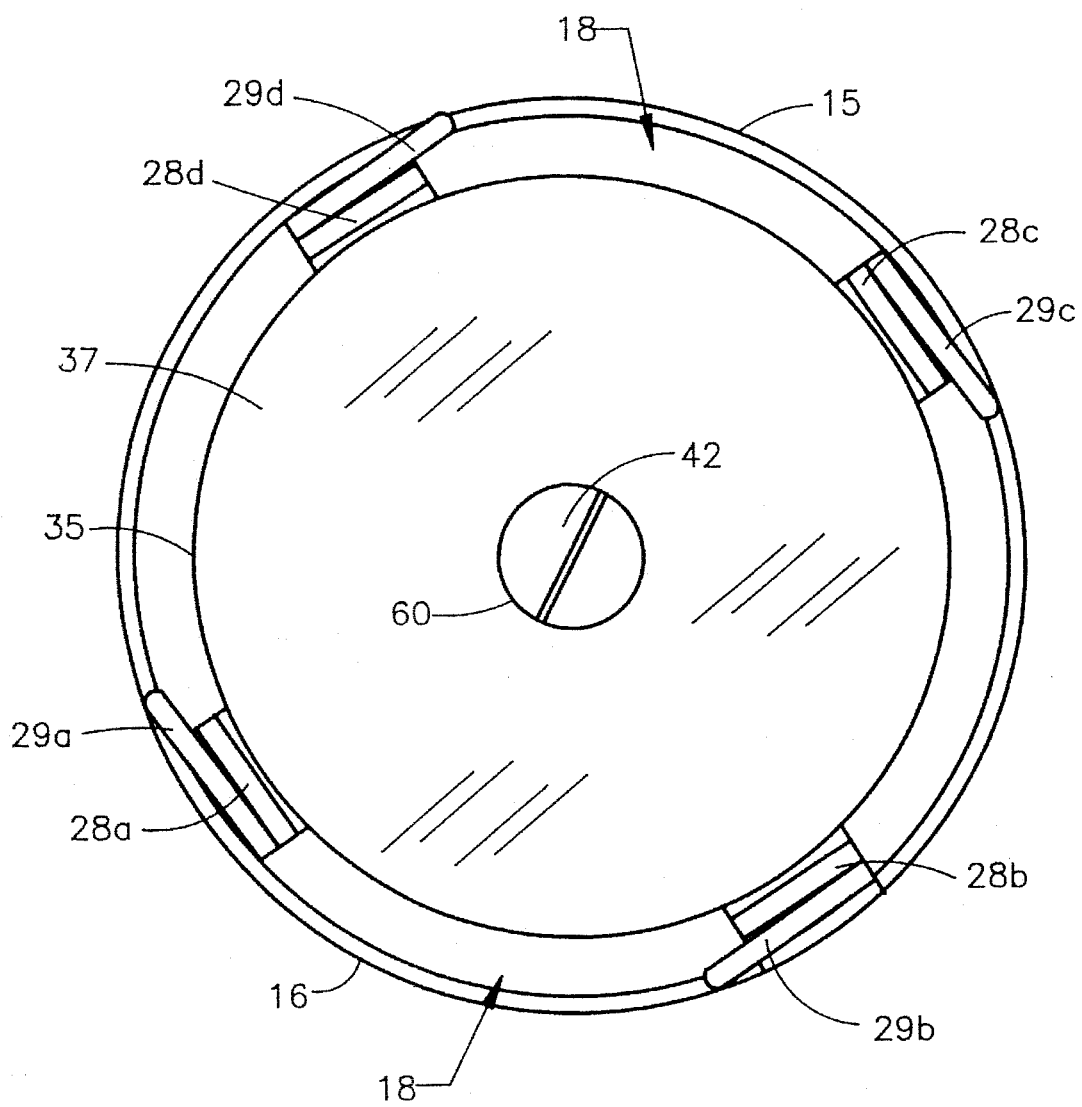
FIG. 3 is a bottom plan view of the ground working device.
Figure 4:
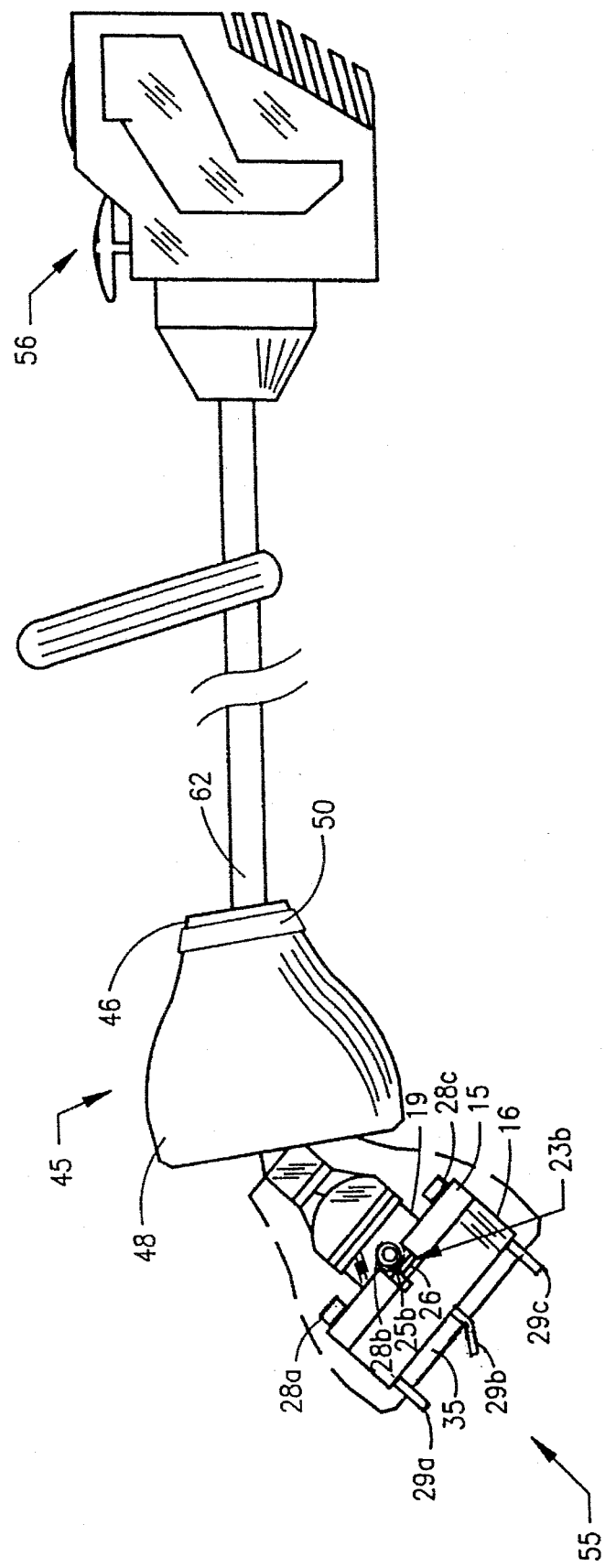
FIG. 4 is a bottom plan view of the ground working means mount of the ground working device.
Figure 5:
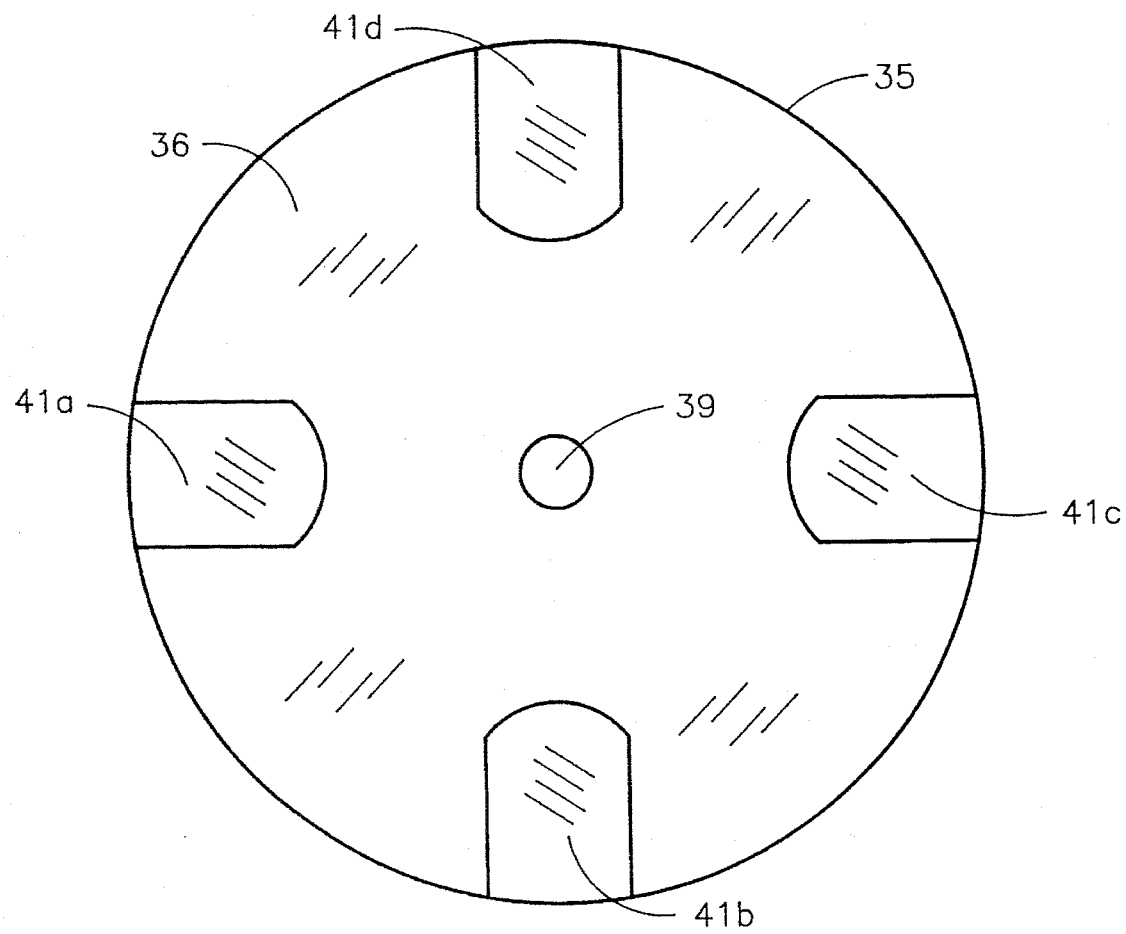
FIG. 5 is a top plan view of the weighted hub of the ground working device.
Figure 6:
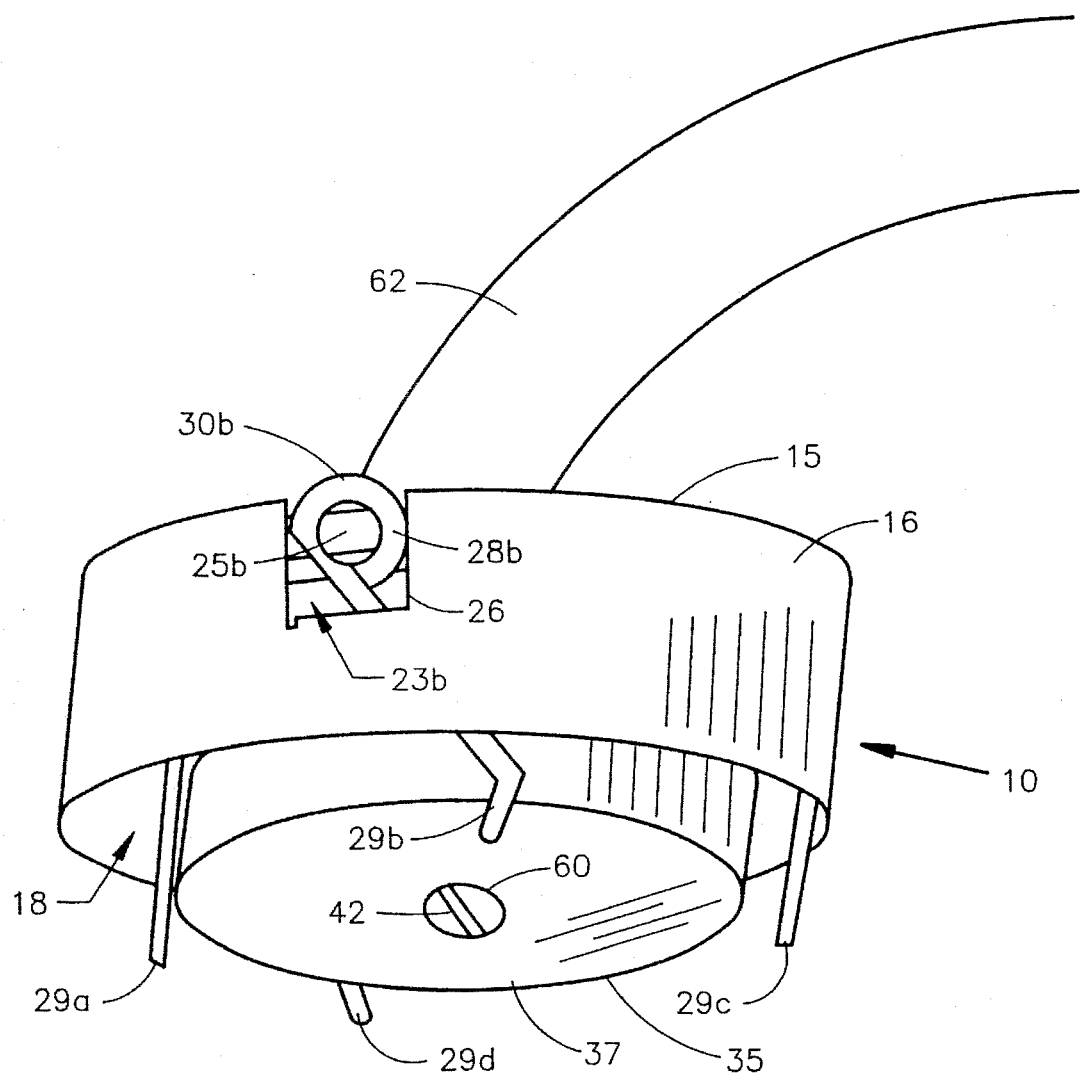
FIG. 6 is a bottom perspective view of the ground working means mount and the weighted hub removed therefrom.

As shown in FIGS. 3, 5, & 6, a disk-shaped weighted hub 35 having a bottom 37, an annular side wall 38, and a top 36 with an axial bore 39 extending from the top 36 through the bottom 37 and having a countersunk depression 40 in the bore 39 in the bottom 37, the bore 39 being adapted to receive the lower portion 61 of the shaft 60 of the powered hand-held rotary device 55, is removeably attached to the bottom portion of the rotatable shaft 60 and is received in the open bottom 18 of the ground working means mount 15, for stabilizing the ground working device and for limiting the penetration or depth of the shank portions 29a–d into the ground. The weighted hub 35 has four depressions 41a–d in and near the perimeter of the top 36 of the hub 35. The depressions are circumferentially spaced about the weighted hub 35 and are adapted to receive at least portions of the coiled portions 30a–d of the ground working means 28a–d. A lower portion of the weighted hub 35 extends outward beyond the bottom 37 of the annular side wall 16 of the ground working means mount 15, and a lower portion of each shank portion 29a–d extends outward beyond the bottom of the weighted hub 35 which further has a rounded bottom edge so that the bottom of the hub 35 doesn't catch or snag on the ground as the user uses the ground working device.

As shown in FIGS. 1 & 6, a flexible, removable shroud 45 preferably made of plastic and shaped generally like a funnel, having a sleeve 46 which has a conical end 48 is mountable and fastenable upon the tubular housing 62 for the rotatable shaft 60 to essentially cover the ground working device to prevent worked-up ground particles such as rocks from being picked up and sent airborne by the shank portions 29a–d thus substantially preventing possible injuries to the user. The conical end 48 of the shroud 45 is essentially annularly spaced from the ground working means 28a–d and mount and covers the top wall 17 and side wall 16 of the ground working means mount 15. The sleeve 46 is adapted to fit about the tubular housing 62 of the rotatable shaft 60 and to slide upon the tubular housing 62. A clamp-like fastener 50 is used to fixedly fasten the shroud 45 to the tubular housing 62. Once the shroud 45 is positioned about the ground working means and mount, the clamp-like fastener 50 is positioned about the sleeve 46 and tightened to urge the sleeve 46 into engagement with the tubular housing 62 to fixedly hold the shroud 45 in place about the ground working means 28a–d and mount. The shroud 45 can be adjusted along the length of the tubular housing 62.

To use the ground working device, the user should provide preferably a gas powered hand-held rotary device 55 having a motor 56 with an elongated rotatable shaft 60 and a means to grasp and control the rotary device 55 and also a fastener member 42 threaded in the bottom end of the shaft 60 for attaching the ground working device to the rotary device 55. The user should then thread out the fastener member 42 in the shaft 60 and face the top wall 17 of the ground working means mount 15 toward the bottom end of the shaft 60 so that the boss 19 and shaft receiving recess 20 is generally aligned with the shaft. The user can then slide the ground working means 28a–d and mount upon the bottom of the shaft 60 with a lower portion 61 of the shaft sliding in the recess 20 and through the bore 22. The shaft 60 has a conventional engagement means such as a nut which should seat in the lower portion 21 of the recess 20. The user should then slide the weighted hub 35 onto the bottom of the shaft 60 through the bore 39 in the weighted hub 35 and then rethread the fastener member 42 in the bottom 37 of the weighted hub 35 through the bore 39 with the head of the fastener member 42 being countersunk in the bore 39 to securely and fixedly attach the hub 35 and ground working means 28a–d and mount to the shaft 60 for rotation therewith. The shroud 45 should be positioned about the ground working means 28a–d and mount and hub 35 and fixedly fastened to the tubular housing 62 of the shaft 60 to prevent objects from being sent airborne. The user can energize the motor 56 of the rotary device 55 which actuates the shaft which rotates the hub 35 and the ground working means mount 15 and can grasp and hold the rotary device 55 so that the hub 35 essentially rests on the ground with the ground working means 28a–d digging or tilling the ground matter. The user can conveniently carry and move the rotary device 55 about so that the ground working means 28a–d digs and tills the ground matter for weeding or cultivating the ground especially in lawns and gardens.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A ground working device for powered hand-held rotary devices comprising:

a plurality of biased ground working means for working the ground;

a mount for securely supporting said ground working means, said mount being detachably attached at an end of a rotatable shaft driven by said powered hand-held rotary device for rotation therewith, said mount having a top wall, a annular side wall, an open bottom, and a boss for receiving a portion of said shaft, said mount further having a plurality of slots spaced about said mount, said slots extending through said top wall for receiving said ground working means; and a hub removably received in said open bottom and being detachably attached to said shaft for rotation therewith and for stabilizing said ground working device and to limit penetration of said ground working means into the ground.

2. A ground working device for powered hand-held rotary devices as described in claim 1, wherein said mount further comprises finger-like supports extending in said slots, one support to each slot, each of said finger-like supports integrally extending from said top wall for further supporting said ground working means.

3. A ground working device for powered hand-held rotary devices as described in claim 2, wherein said finger-like supports are generally disposed in the same plane as each other and said top wall.

4. A ground working device for powered hand-held rotary devices as described in claim 3, wherein each of said ground working means comprises a shank portion extending from a coiled portion and being biasedly penetratable into the ground.

5. A ground working device for powered hand-held rotary devices as described in claim 4 wherein said finger-like supports extend generally through said coiled portions of said ground working means to support said ground working means.

6. A ground working device for powered hand-held rotary devices as described in claim 5, wherein said shank portions extend downwardly through said open bottom of said mount and extend generally parallel to said annular side wall of said mount.

7. A ground working device for powered hand-held rotary devices as described in claim 6, wherein each of said shank portions of said ground working means have a generally arcuate lower portion and have an end slightly disposed in the direction of rotation of said mount to facilitate penetration into the ground.

\* \* \* \* \*